United States Patent [19]

Chupka et al.

[11] Patent Number: 5,262,003
[45] Date of Patent: Nov. 16, 1993

[54] METHOD AND SYSTEM FOR DEFIBERING PAPER MAKING MATERIALS

[75] Inventors: David E. Chupka, Ohio; Peter Seifert, both of Middletown, Ohio

[73] Assignee: The Black Clawson Company, Middletown, Ohio

[21] Appl. No.: 762,547

[22] Filed: Sep. 18, 1991

[51] Int. Cl.$^5$ .............................. D21B 1/08; D21B 1/32
[52] U.S. Cl. .......................................... 162/4; 162/21; 162/18; 162/52; 162/247
[58] Field of Search .............. 162/18, 17, 21, 22, 162/52, 68, 232, 246, 247, 55, 4

[56] References Cited

U.S. PATENT DOCUMENTS

| | | | |
|---|---|---|---|
| 2,616,802 | 7/1949 | Kehoe et al. | 92/6 |
| 2,633,421 | 3/1953 | Chapman | 162/21 |
| 2,697,661 | 12/1954 | Hollis | 92/1.4 |
| 2,882,967 | 4/1959 | Surino | 162/246 |
| 2,910,398 | 10/1959 | Durant et al. | 162/4 |
| 2,977,274 | 3/1961 | Hollis | 162/4 |
| 3,057,769 | 10/1962 | Sandberg | 162/4 |
| 4,188,259 | 2/1980 | Mamers et al. | 162/21 |
| 4,600,545 | 7/1986 | Galli et al. | 162/22 |

FOREIGN PATENT DOCUMENTS 0561763  6/1977  U.S.S.R. ............................ 162/21

OTHER PUBLICATIONS

TAPPI Paper entitled "Steam Explosion Technology and Fiber Recycling".
Stake Technology Literature.

*Primary Examiner*—W. Gary Jones
*Assistant Examiner*—Brenda Lamb
*Attorney, Agent, or Firm*—Biebel & French

[57] ABSTRACT

A process of preparing a suspension of paper making fibers in water for use in the making of paper includes the steps of treating a mass of fibrous materials, such as shredded waste paper materials, with steam under pressure in a closed vessel, and transferring the resulting mixture of treated materials and steam to a second vessel containing a substantial volume of aqueous liquid in such manner that the mixture impacts directly the liquid in the second vessel at very high velocity causing disintegration of the solid materials into essentially separate fibers and contaminant particles accompanied by dispersion of these solids in the liquid in the second vessel. Systems are described for carrying out these process steps on either a continuous or a batch basis.

11 Claims, 2 Drawing Sheets

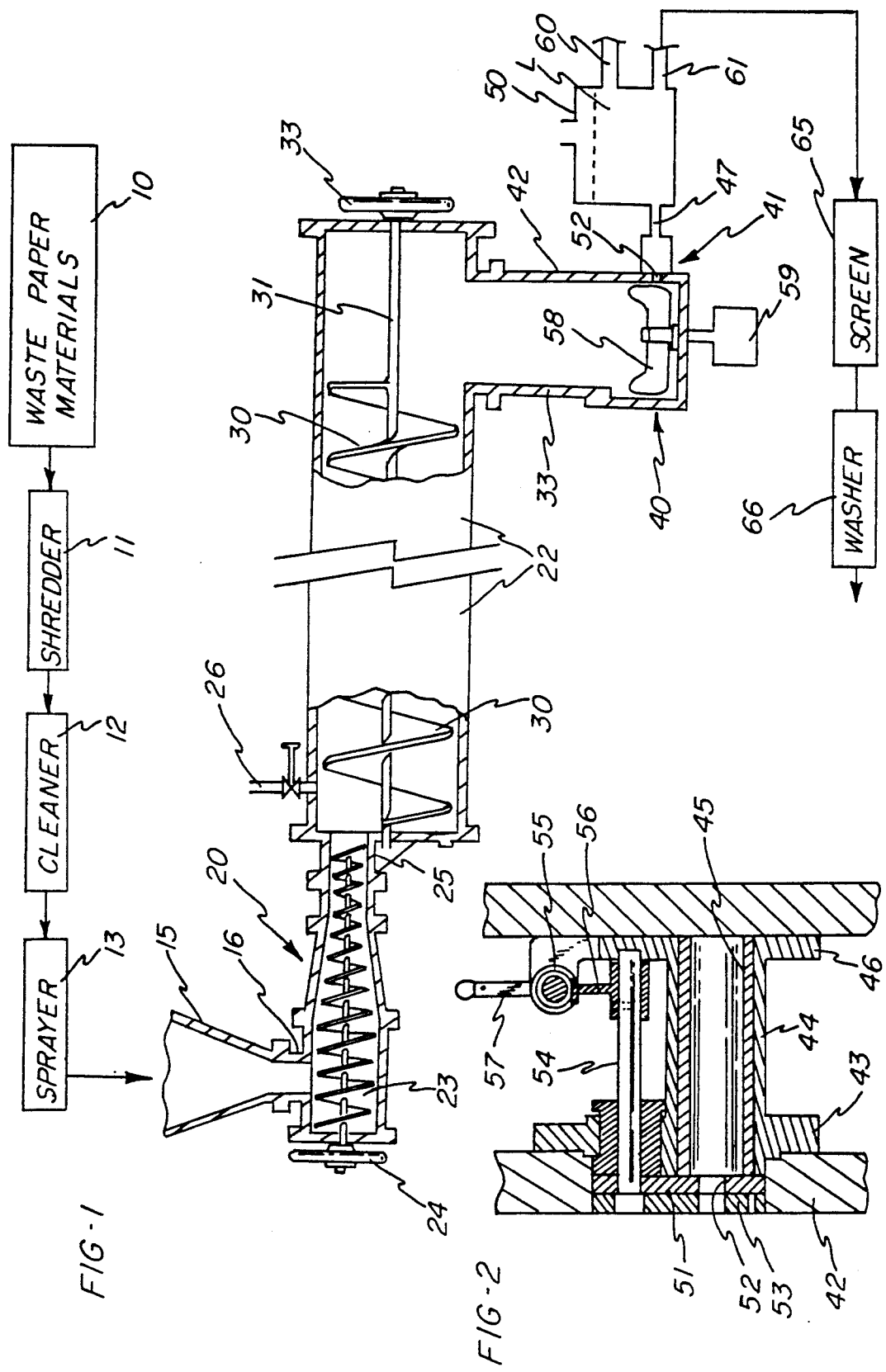

METHOD AND SYSTEM FOR DEFIBERING PAPER MAKING MATERIALS

BACKGROUND OF THE INVENTION

This invention relates to the preparation of fiber suspensions for use in the making of paper, and while it was developed in connection with the preparation of waste paper products for recycling, it is also applicable to the treatment of wood pulp chips and other cellulosic fibrous materials.

The recycling of waste paper products in significant volume is much older than any patent now in force, but the most significant increase in its practice followed World War II when a major increase in the use of corrugated board containers made comparatively large amounts of used cartons available for recycling. Prior to that development, the waste paper products primarily subject to recycling were newspapers and other printed paper, which required deinking as a major stage in their preparation for reuse.

Large quantities of used corrugated cartons which became available for recycling following World War II posed a different preparation problem in that a great many had been assembled with the aid of asphaltic adhesives that were impossible to remove by any commercially feasible process. Further, the asphaltic adhesives tended to appear as substantial globs or smears on the surface of paper products made therefrom, and their use was therefore limited to low grade products such as low grade boxboard.

These problems were relatively successfully avoided by a technique which became known as "asphalt dispersion" by which the asphaltic materials were reduced to such small particle size and were so thoroughly dispersed in the stock that it could be used successfully in a wider variety of boxboard-type products, especially when provided with a cover layer of better grade stock. United States patents disclosing asphalt dispersion technology include Hollis U.S. Pat. Nos. 2,697,661 of 1954, and 2,977,274 of 1961, and Sandberg U.S. Pat. No. 3,057,769 of 1962.

Each of those patents taught that a preliminary step according to its technique was pulping the waste paper products in a conventional manner, followed by digestion under steam pressure to soften the thermoplastic asphaltic materials, and then by subjecting the digested pulp to a refining action, and all three patents show this action being carried out in a disk-type refiner. Each of these patents also taught that the system should include a cyclone for separating the steam from the digested pulp.

A somewhat different approach was proposed in another patent contemporaneous with Sandberg and the second Hollis patent, namely Durant U.S. Pat. No. 2,910,298 of 1959. In the system and method disclosed by Durant, the initial pulping operation was replaced by steps of shredding the waste paper material, cleaning the shredded material to the extent of removing tramp metal and other foreign objects by air-float cleaner apparatus, and then moistening the cleaned waste paper pieces before feeding them into a steam pressure digester. At the discharge end of the digester, Durant provided a different form of refining apparatus where in effect the digested waste paper was subjected to a combing action under steam pressure. The ultimate object was the same as in the Hollis and Sandberg patents, namely to reduce asphaltic contaminants into particles of minimal size and to distribute those particles throughout the fibers.

More recently, a joint development by Wisconsin Tissue Mills and Stake Technology Ltd. was described in a paper entitled "Steam Explosion Technology and Fiber Recycling" presented at a TAPPI conference in March of 1991. The system described in that paper and related literature includes a digesting chamber where high temperature and pressure are maintained throughout the dwell time, following which the cooked waste paper materials are discharged into air at atmospheric pressure and room temperature. The paper lists three runs in which the temperature range was 190° to 203° C., the dwell time was four minutes, and the pressure was approximately 400 psi. The process is described as resulting in particle sizes of residual contaminants of from ½ to 1/10 that of the contaminants in waste paper furnish produced by repulping without steam treatment.

SUMMARY OF THE INVENTION

According to the present invention, it has been discovered that important practical advantages can be achieved if waste paper products to be recycled are shredded, cleaned and moistened, but not pulped, and then after treatment with steam under moderate pressure and temperature conditions for a relatively short time interval, are discharged directly from the steam chamber into a vessel containing a substantial volume of aqueous liquid through an orifice which directs the resulting mixture of cellulosic fibers and steam against or below the surface of that liquid.

In particular, it has been discovered that the use of this technique not only results in a high degree of defibering of the paper materials without requiring preliminary pulping, but also the fibers thus treated show distinctively improved strength characteristics as compared with recycled waste paper products which have been defibered by the process described in the above TAPPI paper. Further, tests indicate that these results are obtained utilizing substantially lower temperature and pressure conditions than in the process described in the TAPPI paper.

The technology provided by the invention is also at least as effective as the process described in the TAPPI paper in that contaminant materials, such particularly as printing inks and adhesives, are reduced to very small particle sizes and also are physically separated from the paper fibers so that they can be readily washed out of the fiber suspension which results from the discharge of the cooked materials directly into a large volume of liquid. Indeed, tests indicate that the separation of such contaminants from the paper fibers is so complete that they can be effectively removed from the fiber suspension by washing and often without the necessity of froth flotation treatments such as have been found necessary in deinking processes according to conventional technology.

Further, while this invention was conceived and initially developed for application to the recycling of waste paper products, it is also applicable to the defibering of cooked wood pulp, and it offers the same advantage of increased fiber strength with such pulps as with waste paper pulps.

Other objects and advantages of the invention will be pointed out in or apparent from the description of the preferred embodiment which follows.

BRIEF DESCRIPTION OF THE DRAWINGS

FIG. 1 is a diagrammatic view illustrating a continuous system embodying and for practicing the invention in the preparation of waste paper materials for reuse in the making of paper; and FIG. 2 is a fragmentary section on a larger scale showing the connection between two components of the system in FIG. 1;

DESCRIPTION OF THE PREFERRED EMBODIMENTS

Figure 3:
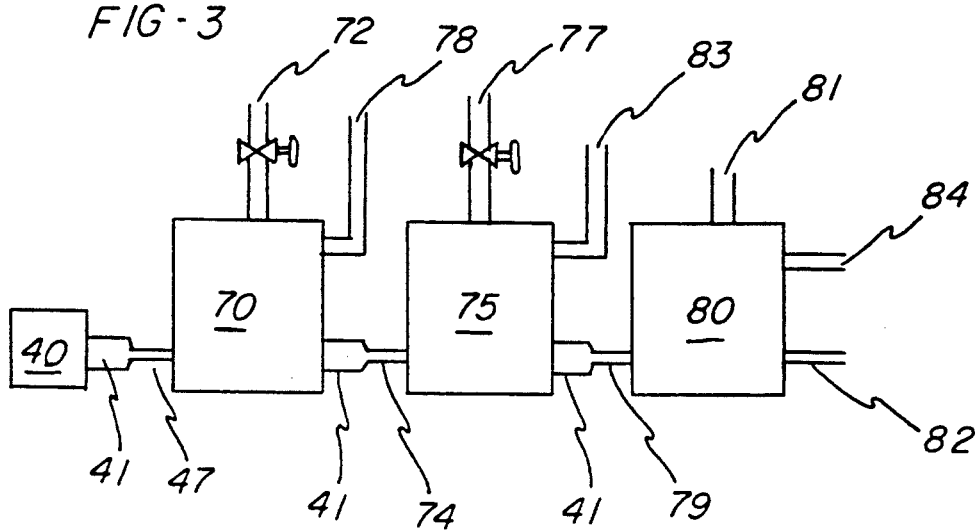
FIG. 3 is a diagrammatic view illustrating a modification of the system shown in FIG. 1.

In the operation of the system shown in FIG. 1, waste paper materials from a supply source 10 are fed first to a shredder 11 of any suitable commercial type which will reduce the paper materials to pieces of a desired size such for example, as approximately 6 to 10 inches square. The shredded materials are then transmitted to a cleaner 12 of any suitable commercially available type which will effect reasonably complete separation of the paper and plastic materials from heavy contaminant pieces or particles such particularly as paper clips, staples and heavy trash of all kinds. Generally, this can be readily done by the use of a cleaner wherein air jets blow the paper and other light materials free of heavy trash.

At the next station 13, the shredded and cleaned waste paper materials are moistened by spraying before being dumped into a hopper 15. In the preferred practice of the invention, the moistening will be only enough to wet the paper materials but not to disintegrate them, e.g. to provide moistened materials with a solids content of the order of 50% or more as they are dumped into the hopper 15.

The chute 16 at the bottom of hopper 15 delivers the shredded, cleaned and moistened but still relatively dry paper materials into the inlet end of a feeder 20 capable of feeding the waste paper material into a pressure digesting chamber 22 without the loss of steam pressure from within the chamber 22. The precise nature of the feeder 20 is not material to the present invention. It is shown as a pressure feeder of the type disclosed in Beveridge U.S. Pat. No. 2,323,194 of 1947 and Kehoe U.S. Pat. No. 2,616,802 of 1952. A feed screw 23 having a drive 24 compresses the paper materials into plug form in the outlet pipe 24 to minimize loss of steam pressure from the tubular digester chamber 22. Alternatively, the feeder 20 could be a rotary valve such as is shown and described in Messing U.S. Pat. No. 3,130,879 of 1964. Steam at super-atmospheric pressure is continuously supplied to the digester 22 by a pipe 26.

The steam treatment chamber 22 is an elongated cylindrical tube wherein a conveyor screw 30 includes a shaft 31 which extends through one end of the tube and is provided with a drive indicated generally at 33. In the practice of the invention for recycling waste paper materials, the dwell time of material in the tube 22 may range from 15 seconds to 5 minutes, depending upon the temperature, which may also vary from as low as 180° F. to as high as 450° F., as further discussed hereinafter. The pitch and speed of screw 30 should be correspondingly designed and controlled.

At its downstream end, the tube 22 is connected by an open pipe 35 with a discharger 40, which is shown as of essentially the construction and mode of operation disclosed in the above Kehoe patent and Surino U.S. Pat. No. 2,882,967 of 1959. This discharger includes a valve assembly 41 mounted on the outside of the discharger housing 42 by a flange 43, and which includes a short tube 44 enclosing a replaceable wear sleeve 45 and having a flange 46 on its outer end. A pipe 47 connects the tube 44 with a tank 50 or other vessel of sufficiently large size to contain a substantial volume of aqueous liquid L, which can be fresh water or white water from elsewhere in the system, and which during operation of the system will comprise an aqueous suspension of the fibers and other solid constituents of the original feed materials.

It is essential to optimum use of the invention that the pipe 47 either connect with the tank 50 at a level sufficiently close to the bottom of the tank to be readily maintained below the liquid level within the container, or that it deliver the discharge therethrough directly against the surface of the liquid L from above, so that the mixture delivered through the pipe 47 impacts the liquid in tank 50. If, therefore, the pipe 47 connects with tank 50 above the level of the liquid L, it should be inclined downwardly so that the material discharged therefrom will directly impact the surface of the liquid.

The end of valve assembly 41 inside housing 42 includes a plate 51 which covers the end of tube 44 and has an orifice 52 therethrough aligned with tube 44. The effective size of orifice 52 can be adjusted by a shutter plate 53 which is fixed on one end of a shaft 54 journalled in the flanges 43 and 46. Adjusting movement of shutter plate 53 is effected by a worm 55 which meshes with gear 56 on shaft 54 and is itself mounted on flange 45 and provided with an operating handle 57. A vaned rotor 58 inside discharge 40 is driven by a motor 59 as described in the Kehoe and Surino patents to wipe the inlet end of orifice 52 periodically and thereby to keep it free of obstructing solids.

When the system shown in FIG. 1 is being operated continuously in the practice of the invention, a mixture of cooked paper materials and steam will be blown at high speed through the orifice 52 and wear sleeve 45. When this high speed jet strikes the liquid in the tank 50, its rate of travel will be so abruptly reduced that the bits, pieces and clumps of paper materials will be explosively disintegrated and distributed in the liquid in the tank 50 to form a suspension of essentially individual fibers. It is important that the pipe 47 be as short as possible, e.g. 12 inches, in order to minimize the distance that the jet travels before impacting liquid, and thereby to minimize the size of the gas bubble which forms before the steam component of the jet is absorbed in the liquid in tank 50.

The disintegrating action on the cooked materials which is produced as just described appears to be due not only to the shock effect of the deceleration of the solid materials as they strike the relatively stagnant liquid in tank 50, but also to mechanical effects created by their passage at high speed through the orifice 52. It appears that if this orifice is sufficiently restricted in flow area, as for example if it is of a square or diamond shape not more than about 1 inch on the side, skin friction will have a combing effect on the solids passing through the orifice which will initiate the disintegration that is completed by their deceleration in the liquid.

It is important for the purposes of the invention that the disintegration of the cooked materials as they are discharged through the orifice 52 and into the liquid in tank 50 is not limited to defibering, but is also highly effective in disintegrating contaminant materials such particularly as inks which comprise pigment material and an organic binder. More specifically, such inks are sometimes present as relatively large particles or "blobs" on the surface of waste paper material. The process of the invention is effective not only in separating such ink deposits from the paper fibers, but also in disintegrating ink particles of significant size into specks which are of such small size that they can readily be eliminated from the suspension of fibers by washing steps which are conventional in deinking processes.

Similar results have been noted in testing of the invention with respect to contaminant materials other than inks, such as organic adhesives which are commonly present on waste paper materials, and which also are separated from the paper fibers and so reduced in particle size that they can be readily eliminated by washing. In particular, hard contaminant particles, such as thermoset inks, are shattered into such small particles that they are readily removed in a subsequent washing step.

It is desirable that the suspension which is formed in the tank 50 not exceed a consistency range wherein it is freely pumpable. This objective is readily accomplished by continually adding fresh liquid, as indicated by a supply pipe 60 in FIG. 1, preferably at a rate which substantially balances in volume the amount of suspension which is continuously taken away by discharge pipe 61. It is another advantage of the invention that the steam which leaves the discharger 40 with the cooked paper materials is absorbed in the liquid in tank 50, it correspondingly heats the suspension taken away by pipe 61, which is desirable in the further treatment of the suspension, while the replacement liquid from pipe 60 need not be heated.

Since as noted above, the suspension produced in the tank 50 includes substantial quantity of small contaminant particles along with the fibers, it is desirable that the next stage of its treatment be at a screening station 65 where any large contaminant particles are separated from the fiber suspension, including pieces of sheet plastic which have been shriveled by the steam treatment so that they are easily removed by a screen of a type conventionally used in the treatment of paper making stock. The screening station 65 will normally be followed by a washing station 66, such as washing apparatus as described in Seifert U.S. Pat. No. 4,722,793 where the ink and other small contaminant particles are removed.

As noted above, the temperature, pressure and time of treatment in the digesting chamber 22 can vary over substantial ranges, depending upon the identity of the materials being subjected to the process. It is desirable, however, that the pressure and temperature conditions be kept well below those described in the above TAPPI paper, both to minimize cost and especially to minimize degradation of the paper fibers.

For example, comparative testing has been carried out wherein waste paper materials were treated in accordance with the invention for three minutes at 100 psi and 170° C. and were compared with similar waste paper products processed in accordance with the TAPPI paper for from two to five minutes at a temperature of 220° and pressure of 322 psi. Sample sheets made from the fibers produced by each of these processes indicated that the product of the process of the invention was distinctly superior in strength and also lighter in color, while the production cost was necessarily lower in view of the significantly lower pressure and temperature conditions.

For preferred results in the practice of the invention, it is important that the difference in pressures in the discharger 40 and the tank 50 be more than the critical value, i.e. the absolute pressure drop across the orifice 52 should be greater than 2 to 1. For example, if the tank 50 is vented to atmosphere, as indicated at 67, the pressure within the digester tube 22 and discharger 40 should be greater than approximately 30 psi. Under these conditions, the mixed steam and solid particles passing through the orifice 52 will constitute a jet traveling at the speed of sound when it impacts on or below the surface of the liquid in tank 50. It has been determined that under these operating conditions, the process is highly effective in defibering and otherwise disintegrating the solid materials is at an optimum.

It is also believed to be important to obtaining maximum advantages from the technology of the invention that the length of the passage from the orifice 52 to the liquid bath in tank 50 be as short as possible. More specifically, it is believed that if the cooked materials are discharged into a cyclone, as in the prior art systems and processes described hereinabove, the resulting comparatively prolonged exposure of defibered material to the heat of the steam carrying them to the cyclone is detrimental to fiber strength, as well as to color.

These undesirable results are believed to be accentuated if the length of the passage from the point where the cooked materials are released from cooking pressure to the point where they are separated from the steam is relatively long. In contrast, the preferred operating conditions for the process of the invention call for virtually instantaneous transfer of the mixture of solids and steam from the orifice 52 into the liquid in tank 50, and since that liquid can be kept relatively cool, by constant replacement of suspension with water at room temperature or less, there is virtually instantaneous cooling of all solids discharged from the digester.

Further, in addition to the shock of sudden deceleration of which the cooked materials are subjected when they are discharged into the large volume of liquid in the tank 50, the simultaneous release of the pressure thereon creates conditions of explosive decompression, which further contribute to the desired essentially complete defibering and dispersion. At the same time, another factor contributing to effective defibering is the mechanical action on the cooked materials as they are driven at high speed through the orifice 52. This mechanical effect can be multiplied by the modified system as shown in FIG. 3 as now described.

In FIG. 3 the tank 70 corresponds to the tank 50 in FIGS. 1 and 2, but instead of being vented to the atmosphere, provision is made for maintaining the liquid in tank 70 under positive pressure lower than is maintained within the cooking chamber 22. For example, if the steam pressure in chamber 22 is 300 psi, an air pressure pad may be maintained at 130 psi in the top of the tank 70, by a controlled pressure source 72. Since the pressure drop from discharger 40 to tank 70 will be more than critical, the solid materials passing through valve assembly 41 will be subjected to the same mechanical and shock forces described in connection with FIG. 1.

Then instead of discharging the contents of tank 70 directly to a washing station as in FIG. 1, the tank 70 may be connected by another valve assembly 41 and a pipe 74 to a second tank 75, the interior of which is maintained under positive pressure lower than that in tank 70, e.g. 45 psi, by a controlled pressure source 77. The flow of suspension from tank 70 is replaced by liquid, which can be water, as indicated at 78.

In passing from the tank 70 to the tank 75, the solid materials are again subjected to both the mechanical action of passing through an orifice and the shock of striking the relatively stagnant liquid in the tank 75, and these actions are repeated in passing through a third valve assembly 41 and a pipe 79 into a third tank 80, which may be vented to atmosphere at 81 and from which he suspension is withdrawn by a line 82 for further processing. These operations of repeated passage through an orifice at high speed into a relatively stagnant body of liquid cause repetition of the explosive decompression of the fibers if the particular mix of raw materials is found to be inadequately defibered in a system having a single tank 50 as described in connection with FIG. 1. As with tanks 50 and 70, the flow of suspension from each of tanks 75 and 80 is replaced by a liquid (water) supply line 83 and 84 respectively.

As previously noted, while the process of the invention was initially developed in connection with the preparation of paper making stock from waste paper materials, it is applicable to other fiber-containing materials such particularly as wood chips and other fibrous materials which are convertible into paper making fibers. When the process is to be practiced with wood chips, the shredding, cleaning and moistening stations 11-13 are not used, and the chips are delivered directly into the hopper 15 for passage into the feeder 20.

The treatment of chips in the digester tube 22 would require the addition of chemicals as well as steam, and the cooked chips would be supplied to the discharger 40 where they would be sufficiently broken up by the rotor 58, as described in the Kehoe patent, for discharge through the orifice 52 into the tank 50. The combined effect of high speed passage through the orifice 52 followed by impact on the relatively stationary pool of liquid in tank 50 will cause substantial defibering of the chips, although normally not as complete defibering as with waste paper materials as already described. The resulting suspension will then pass through a rough screening station 65 to the washing station 66 where the defibered chips are washed free of cooking liquor, for example in pulp washing apparatus such as is shown in Ericsson U.S. Pat. No. 4,154,644, followed by other processing stations conventional in converting cooked chips to paper making stock.

Figure 4:
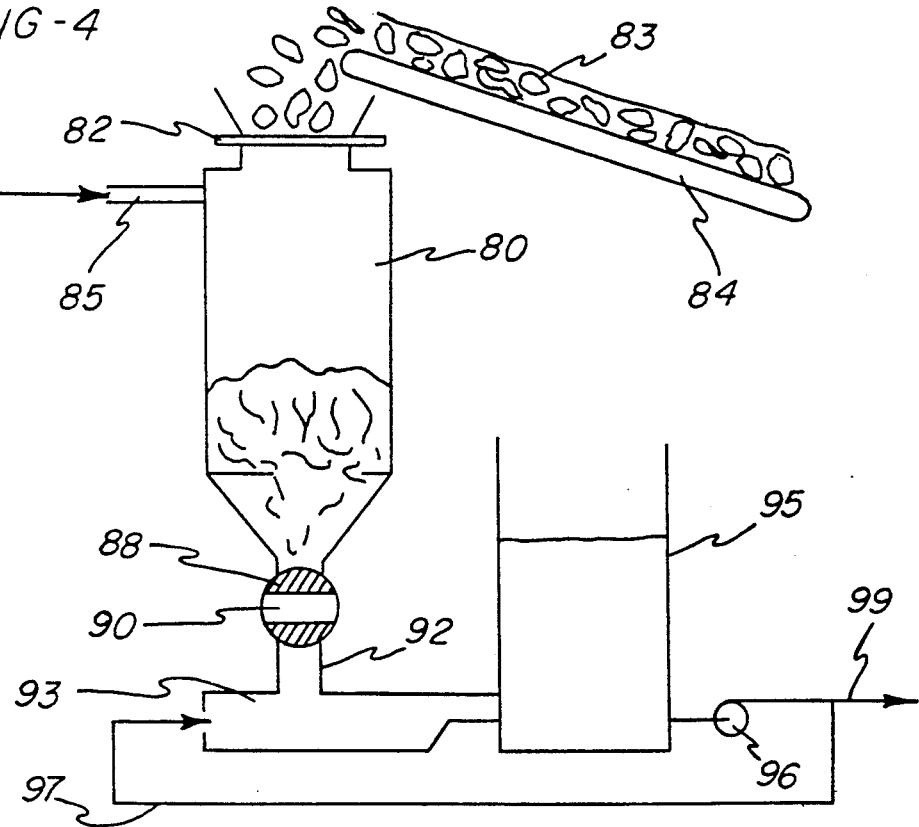
FIG. 4 is a diagrammatic view illustrating a system for practicing the process of the invention on a batch basis.

FIG. 4 illustrates diagrammatically a system for carrying out the process of the invention on a batch basis. The digester chamber 80 is provided at its upper end with a charging valve 82 through which a charge 83 of shredded, air classified and moistened waste paper material is delivered by a conveyor 84. Steam, and any necessary chemicals, are introduced to the top of chamber 80 by a supply line 85. At its lower end, the chamber 80 is provided with a discharge valve 88 having an orifice passage 90 therethrough, and an outlet pipe 92 leads from the valve 90 into the top of a vessel 93, which may be a pipe of substantial diameter, e.g. 12 inches, and which is connected at one end with a large tank 95 filled with liquid L to a level above its connection with the vessel 93.

With this system as shown in FIG. 4, after the charge in chamber 80 has been adequately stream-treated, for example from 2 to 4 minutes at 50 psi, the valve 88 can be shifted to its open position, or it can be oscillated so that the charge within chamber 80 will be discharged through the orifice passage 90 in periodic bursts. In either case, the mixture of steam and solid materials will be forced at high speed through the orifice passage 90 into the vessel 93, which is kept continuously filled with circulating liquid by a pump 96 that draws liquid from the tank 94 and recirculates some of that liquid to the upstream end of the vessel 93, as indicated by the line 97, to carry any uncondensed steam from valve outlet pipe 92 into the tank 95 while the remainder of the resulting suspension from the tank 95 is forwarded at 99 to the next station in the system.

While the processes herein described, and the forms of apparatus for carrying these processes into effect, constitute preferred embodiments of this invention, it is to be understood that the invention is not limited to these precise processes and forms of apparatus, and that changes may be made in either without departing from the scope of the invention, which is defined in the appended claims.

What is claimed is:

1. In a process of preparing a suspension of cellulosic fibers in an aqueous liquid, the steps of:
   (a) treating a mass containing relatively dry cellulosic fibrous materials by direct application of steam under pressure in a first vessel to form a pressurized mixture of the resulting cooked mass and steam,
   (b) providing a second vessel adjacent said first vessel containing a substantial volume of aqueous liquid,
   (c) maintaining said volume of liquid under substantially lower pressure than that of the interior of said first vessel,
   (d) connecting said first vessel with said second vessel through an orifice located below the surface of said liquid to cause a high speed jet composed of said mixture of cooked mass and steam to travel through said orifice from said first vessel to said second vessel, and
   (e) disintegrating said mass by causing said jet to impact directly said volume of liquid below the surface thereof in said second vessel.

2. The process defined in claim 1 further comprising a step of maintaining a difference in pressure between said first and second vessels above a critical value, defined as an absolute pressure drop greater than 2 to 1.

3. The process defined in claim 1 comprising further steps of continuously withdrawing a resulting suspension from said second vessel, and replacing said withdrawn suspension in said second vessel with water at a rate maintaining the consistency of said withdrawn suspension within a predetermined range.

4. The process defined in claim 1 wherein said fibrous materials comprise waste paper materials which include heat softenable contaminant substances subject to softening by said treating step, and said impact-causing step causes hardening of particles of said contaminant substances softened by said treating step and dispersing of such hardened particles in said volume of liquid separately from said fibers.

5. The process defined in claim 1 wherein said fibrous materials comprise said waste paper materials which are contaminated by ink, and said impact-causing step causes such ink to be separated from said fibers and to be dispersed as fine particles in said volume of liquid.

6. The process defined in claim 3 wherein said fibrous materials comprise waste paper materials which include sheet plastic materials, and said process includes a preliminary step of shredding said waste paper and plastic materials prior to treating thereof in said closed vessel, said treating step causes shriveling of said sheet plastic materials into discrete pieces separate from said fibers, and said withdrawing step is followed by a step of screening the withdrawn suspension to remove said shriveled plastic materials therefrom.

7. The process defined in claim 1 wherein said fibrous materials comprise waste paper materials, and said process includes, prior to said treating step, preliminary steps of shredding said waste paper materials, cleaning said shredded materials by removing heavy contaminant particles therefrom, and delivering said shredded and cleaned waste paper materials to said first vessel.

8. The process defined in claim 1 wherein said fibrous materials comprise waste paper materials, and said process includes, prior to said treating step, preliminary steps of shredding said relatively dry waste paper materials, cleaning said shredded materials by removing heavy contaminant materials therefrom, and moistening said cleaned waste paper materials prior to said treating step.

9. The process defined in claim 1 wherein said fibrous materials comprise wood chips, and wherein said treating step comprises treatment of said chips with chemicals under steam pressure.

10. The process defined in claim 1 wherein said volume of liquid in said second vessel is open to atmospheric pressure.

11. The process defined in claim 1 wherein said volume of liquid in said second vessel is under pressure less than the pressure in said first vessel but greater than atmospheric pressure, and further comprising the step of connecting said second vessel with a third vessel containing a large volume of aqueous liquid through a second orifice located under the surface of said liquid in said third vessel, said volume of liquid in said third vessel being under pressure less than the pressure in said second vessel, whereby the suspension of treated materials in said second vessel is forced at high speed through said second orifice between said second and third vessels and caused to impact said volume of liquid below the surface thereof in said third vessel.

* * * * *